S. F. WALKER & A. W. WALTON.
TROLLEY.
APPLICATION FILED JUNE 9, 1909.
1,069,208.
Patented Aug. 5, 1913.
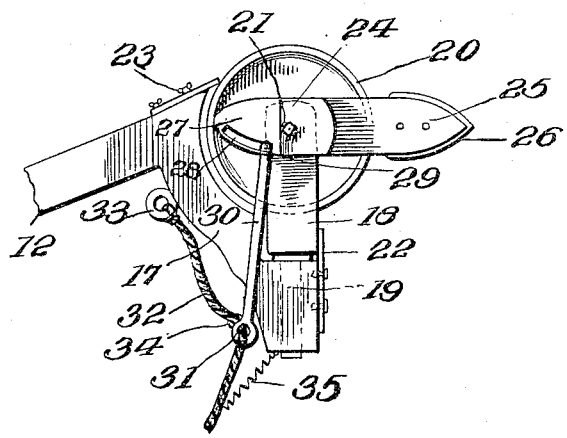
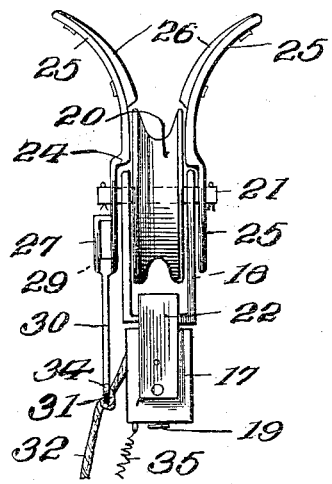
Inventors
S. F. Walker and
A. W. Walton
Witnesses
By
Attorneys.

UNITED STATES PATENT OFFICE.

SAMUEL F. WALKER, OF BOZEMAN, AND ALBERT W. WALTON, OF BUTTE, MONTANA; SAID WALKER ASSIGNOR TO SAID WALTON.

TROLLEY.

1,069,208.

Specification of Letters Patent.

Patented Aug. 5, 1913.

Application filed June 9, 1909. Serial No. 501,086.

*To all whom it may concern:*

Be it known that we, SAMUEL F. WALKER and ALBERT W. WALTON, citizens of the United States, residing, respectively, at Bozeman, county of Gallatin, and Butte, county of Silverbow, both in the State of Montana, have invented certain new and useful Improvements in Trolleys, of which the following is a specification.
The present invention comprehends certain new and useful improvements in trolleys for electric railways, and the object of the invention is to provide an improved finder, and to provide improved means for positively actuating the finder so as to project the same above the trolley wheel to assist in replacing the wheel in engagement with the trolley wire.

Another object of the invention is to provide a finder consisting of spaced members that are pivotally mounted on opposite sides of the trolley wheel in such a manner as to turn together, said members normally assuming an inoperative position so as to be entirely out of the way.

A further object of the invention is to provide cam slots on one of the members of the finder, and to provide means engaging with and operating in the cam slots for turning both finder members about their pivots.

With this and other objects in view that will more fully appear as the description proceeds, the invention consists in certain constructions and arrangements of the parts that we shall hereinafter fully describe, and then point out the novel features thereof in the appended claim.

For a full understanding of the invention and the merits thereof and also to acquire a knowledge of the details of construction, reference is to be had to the following description and accompanying drawings, in which:
Figure 1 is a side elevation of a trolley equipped with the improvements of our invention, and, Fig. 2 is an end view thereof.

Corresponding and like parts are referred to in the following description and indicated in all the views of the drawings by the same reference characters.

The trolley pole 12 terminates at its outer or free end in a downwardly curved supporting arm 17 that carries a bifurcated bracket or harp 18, the shank 19 of the bracket being journaled in the supporting arm, so as to turn about a substantially vertical axis in the operative position of the trolley pole. Interposed between the bifurcations of the bracket is a trolley wheel 20 which is rotatably mounted on an axle 21 that extends transversely of and is journaled in the bifurcations. By virtue of the swiveled connection of the bracket, the trolley wheel is adapted to turn laterally to accommodate itself to the trolley wire when rounding a curve. In order to yieldingly maintain the trolley wheel against such turning movement, however, a flat spring 22 is secured to the extremity of the supporting arm and projects upwardly therebeyond and bears against the bracket 18. A guard plate 23 is adjustably secured to the outer end of the pole with one edge disposed in close proximity to the adjacent portion of the periphery of the trolley wheel, thereby precluding the possibility of transverse guide wires or the like becoming lodged between the wheel and the curved supporting arm 17.

The extremities of the axle 21 preferably project beyond the corresponding bifurcations of the bracket and have side members 24 fitted thereon at corresponding intermediate points, the projecting ends of the axle being preferably polygonal in cross section and the openings in the side members for the reception of such ends being similar in form, to insure of the side members swinging together. The outer ends of the side members project beyond the periphery of the trolley wheel and are oppositely and laterally deflected to constitute finders 25, metallic shoes 26 being secured to the opposing faces of the finders to protect the same from wear. The finders are considerably heavier than the opposite ends of the side members and therefore tend to swing downwardly by gravity to assume inoperative positions below the upper portion of the trolley wheel.

One of the side members 24 is provided at its inner end with a housing 27 the opposing side walls of which are formed with corresponding cam slots 28. Operating in the slots are laterally turned lugs 29 formed at the upper end of a link 30 which projects into the housing. The link depends from the housing with its lower end extending below the curved supporting arm 17 and terminating in a guide ring 31 through which passes a controlling rope 32, the rope being fastened at its upper end to an eye 33 that is secured to the supporting arm at a point removed from the guide ring. Intermediate of the eye and the guide ring and in close proximity to the latter, the rope is knotted, as indicated at 34, whereby to limit its downward movement through the guide ring. A tension spring 35 is connected to the rope below the guide ring and pulls upwardly on the same, so as to normally maintain the rope slack between the guide ring and the securing eye 33 and thus relieve the link 30 of tension and admit of the finders assuming inoperative positions.

In order to actuate the finders it is merely necessary for the operator to pull downwardly on the rope against the tension of the spring 35 to move the knot 34 against the guide ring 31, the continued tension on the rope taking up the slack between the guide ring and the eye 33 and exerting downward tension upon the link 30, whereby to turn the side members in such a direction as to project the finders upwardly above the trolley wheel. The rope 32 is pendent in convenient reach from the adjacent platform of the car and is also used for controlling the position of the trolley pole.

Having thus described the invention what is claimed as new is:

A wire finder for trolley heads comprising an axle journaled in the harp and disposed to support the trolley wheel, fingers supported on the terminals of the axle at a point adjacent their ends, the fingers normally being disposed parallel with the trolley wire, the terminal adjacent the pivot of one of the fingers being curved and provided with an arcuate slot, a link one terminal of which is provided with a lug extending within said slot, the terminal of the link remote from the lug being formed with a loop, an eye supported by the harp, the trolley rope having one of its terminals secured to said eye, the rope passing through the loop of the link and being knotted intermediate the loop and the eye, and a spring connecting the harp and the rope whereby the rope is maintained slack above the loop.

In testimony whereof we affix our signatures in presence of two witnesses.

SAMUEL F. WALKER. [L. S.]
ALBERT W. WALTON. [L. S.]

Witnesses for Walker:
J. D. WERLING,
C. S. PIPER.

Witnesses for Walton:
M. D. KELLY,
C. S. PIPER.